United States Patent [19]

Kitazawa et al.

[11] 4,096,899
[45] Jun. 27, 1978

[54] LIGHT WEIGHT PNEUMATIC TIRE HAVING A THIN SIDE WALL RUBBER

[75] Inventors: Yoichi Kitazawa, Kodaira; Takeshi Sato, Higashi-Yamato; Hisao Tsuji, Akigawa, all of Japan

[73] Assignee: Bridgestone Tire Co., Ltd., Tokyo, Japan

[21] Appl. No.: 720,294

[22] Filed: Sep. 3, 1976

[30] Foreign Application Priority Data

Sep. 18, 1975 Japan ............................ 50-112066

[51] Int. Cl.² ............................................. B60C 9/06
[52] U.S. Cl. ........................... 152/354 R; 152/357 R; 152/362 R; 152/374
[58] Field of Search ............... 152/354, 355, 357, 374, 152/362 R, 361 R, 330 R, 357 R, 357 A

[56] References Cited

U.S. PATENT DOCUMENTS

| | | |
|---|---|---|
| 3,481,386 | 12/1969 | Menell et al. ....................... 152/354 |
| 3,509,930 | 5/1970 | Mirtain ............................... 152/354 |
| 3,861,440 | 1/1975 | Ochiai et al. ........................ 152/354 |
| 4,006,766 | 2/1977 | Takayanagi et al. ................ 152/354 |

Primary Examiner—Randolph A. Reese
Attorney, Agent, or Firm—Sughrue, Rothwell, Mion, Zinn and Macpeak

[57] ABSTRACT

A light weight pneumatic tire having a thin side wall rubber is disclosed. The thin side wall rubber has previously been squeezed on that region of the outer surface of an upper ply which corresponds to the side wall portion of the tire prior to the tire shaping step and possessed of a Shore A hardness after vulcanization of 40° to 55°, an excellent flex-cracking and weather resistant property. The upper ply is superimposed about at least a portion extending from a hump portion to a bead portion of the tire and composed of cords coated with a high resilient rubber. A tread rubber layer is extended across the thin side wall rubber layers and pressed and made integral therewith by stretching.

11 Claims, 5 Drawing Figures

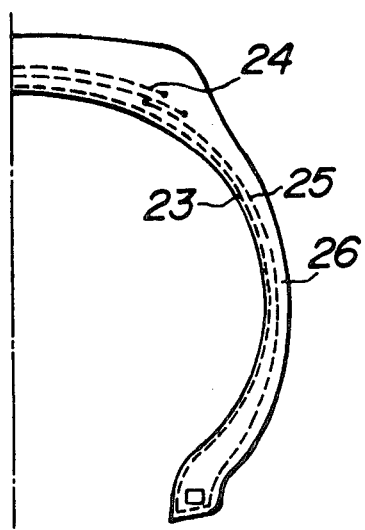
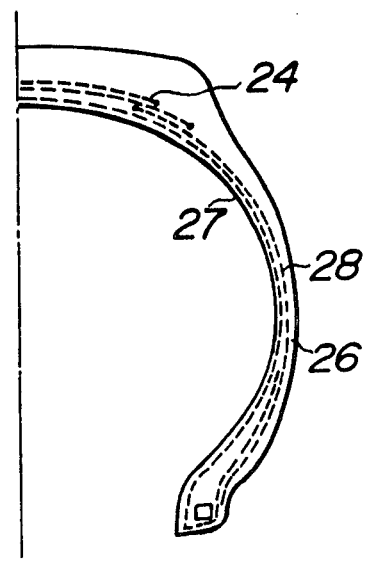

LIGHT WEIGHT PNEUMATIC TIRE HAVING A THIN SIDE WALL RUBBER

This invention relates to light weight pneumatic tires and more particularly to a light weight pneumatic tire having a thin side wall rubber.

A pneumatic tire is divided with respect to its carcass construction into first a bias tire comprising rubberized carcass plies each containing a plurality of cords inclined with respect to the circumferential direction of the tire and oppositely inclined to the cords associated with the other carcass ply. The second is a radial tire comprising rubberized carcass plies each containing a plurality of cords disposed in radial planes or inclined at a very small angle from such radial plane.

The bias tire is produced by a one step method comprising superimposing all of the tire members about a former one upon the other in succession in substantially cylindrical shape so as to produce a green case, and deforming the green case in a shaping and vulcanizing metal mold into a toroidal shape and then effecting shaping and vulcanization of the tire.

The radial tire is produced by a two step method comprising superimposing tire members exclusive of a belt and a tread rubber layer about a former one upon the other in succession in substantially cylindrical shape so as to produce a green case, deforming the green case into a toroidal shape, and superimposing the belt and the tread rubber layer about the toroidal green case. The reason why the radial tire is required to be produced by the two step method is that the difference between the inclined cord angle of the carcass ply and the inclined cord angle of the belt reaches to up to 60° to 80°, while in the bias tire the difference between the inclined cord angle of the carcass ply and the inclined cord angle of the breaker is at most on the order of 10°. As a result, in the radial tire, if the belt and the tread rubber layer are superimposed about any other tire members on top of the former, the green case inclusive of the belt and the tread rubber layer could not be deformed into a toroidal shape.

Hence, the bias tire has the advantage that the use of the one step method makes it possible to produce the bias tire in a less expensive manner. On the other hand, the radial tire has the advantage that the in use characteristics thereof are superior to those of the bias tire, but it has the disadvantage that the two step method results in difficult production and increased cost of the tire.

The above mentioned advantageous effect of the one step method, however, has become ambiguous owing to the needs of the recent developed use of the tire.

That is, in the conventional one step method, a composite contour composed of a tread rubber layer and a pair of side wall rubber layers superimposed about each side of the tread rubber layer is extruded by means of a dual tuber into one integral body which is then applied into a former. Then, one single operation is effected to the outer surface of rubber of the tire consisting of the tread rubber layer and the side wall rubber layer to produce a green case. Such a method of extruding different kinds of tread rubber layer and side wall rubber layer into one integral body which can reduce the number of steps and satisfy the different characteristics required by the tread rubber layer and the side wall rubber layer has been proposed and described, for example, in U.S. Pat. No. 3,849,045 and 2,445,725.

Recent significant developments relating to pneumatic tire materials, particularly conspicuous improvement in road conditions results in the thickness of the side wall rubber layer, which has heretofore been required to be thick, be reduced to as thin as possible for the purpose of obviating the disadvantage of heavy weight and excessive heat generation due to large thickness of the side wall rubber layer. As a result, the difference between the thickness of the side wall rubber layer and the thickness of the tread rubber layer becomes considerably large.

This makes formation of the composite contour by the extrusion process very difficult. In addition, the side wall rubber layer which has been reduced in thickness as described above may be subject to undulation produced due to centrifugal force during rotation. The side wall rubber layer may become irregular in thickness due to bad extrusion, thereby causing the tire to be non-uniform and unbalanced to construction.

Attempts have been made to abandon the method of extruding the tread rubber layer and the side wall rubber layer into one integral body and instead of prebond separate contours formed by separately extruding respective tread rubber layer and side wall rubber layer with each other. In such attempts, however, undulations also occurred on the thin side wall rubber layer when it is stitched by means of a stitching roller.

Even in a prior art method of producing a radial tire in which a pair of side wall rubber layers are superimposed about a carcass ply disposed on a cylindrical former, these side wall rubber layers are required to be thin in thickness, and as a result, the above described problem also occurred.

An object of the invention, therefore, is the provision of a light weight pneumatic tire which features and employs a novel side wall portion, which can be produced by a one step or two step method in a high production efficiency, and which is light in weight and of improved characteristics.

The reduction in weight of the pneumatic tire results in high speed rotation of the tire, a decrease in heat generation which is accelerated under heavy load conditions and also a decrease in resistance to rolling under improved road conditions which can alleviate excessive protection of the carcass ply by the side wall rubber outer surface.

It is necessary to protect the carcass ply from external forces unavoidably subjected to the external surface of the side wall rubber when the tire makes slight contact with curb on the road. For this purpose, the thin rubber layer according to the invention is required to have a shore A hardness after vulcanization of 40° to 55°, an excellent flex-cracking and weather resistant property. In this case, the thickness of the thin rubber layer is required to be 0.5 to 3.0 mm, preferably 0.5 to 2.0 mm.

The above mentioned kind of thin side wall rubber is not suitably adhered under pressure to any other tire members on the former by means of a stitcher roll.

In accordance with the invention, use is made of an upper ply composed of a rubberized fabric containing a plurality of mutually parallel cords and extending at least from a hump portion to the bead portion of the tire. The upper ply is provided at that region of the outer surface thereof which corresponds to the side wall portion of the tire with a thin rubber layer formed of the above mentioned material, the thin rubber layer being previously squeezed on the above mentioned region of the side wall portion of the upper ply prior to its adherence to the main carcass ply in the step of producing the tire.

The upper ply may be composed of an outside turn-up portion of the main carcass ply, the upper end of the turn-up portion being terminated at a hump portion of the tire.

The upper ply may also be composed of a side ply superimposed about that portion of the main carcass ply which is located between the hump portion and the bead portion of the tire. In addition, the upper ply may be composed of an uppermost ply of a plurality of main carcass plies extending from one of a pair of bead portions through a crown portion of the tire to another bead portion. Each of these upper plies is composed of a rubberized ply containing a plurality of mutually parallel cords coated with rubber having an excellent resistance to heat, that is, having a high resilience.

The thin rubber layer may be squeezed on that region of the upper ply which corresponds to the side wall portion by any squeezing means, preferably by using calender rolls. In this case, the thickness of the thin rubber layer must suitably be selected to an estimated thickness by considering the reduction in thickness which is produced when the tire is deformed into a toroidal-shape.

The invention may be applied to the one step method such that an extruded tread rubber layer and a breaker are superimposed about a former, prior to deformation thereof into a toroidal shape and the tread rubber layer is pressed by a stitcher roll upon the thin rubber layer which has previously been squeezed on the upper ply.

The invention may also be applied to the two step method such that, after deformation of the green case, a tread rubber layer having a Shore A hardness after vulcanization of 55° to 70° and an excellent abrasion resistant property and a belt reinforcing layer are superimposed about an inflated carcass ply and the tread rubber layer composed of a center body portion and side edge portions made integral therewith by extrusion and formed of rubber which is the same as the thin rubber layer squeezed on the upper ply, is pressed by a stitcher roll upon the thin rubber layer which has previously been squeezed on the upper ply.

In both the one step method and the two step method, the cords of the upper ply are coated with rubber having an excellent heat resistant property and low resilience which is the same as the rubber for coating the carcass ply. On the contrary, the thin rubber layer to be squeezed down on the upper ply is composed of rubber having an excellent flex-cracking resistant property, weather resistant property which causes the rubber not to change its quality even when it is exposed to wind, rain, ozone, ice and snow and resistance to cut failure which is sufficient to prevent damage to be occurred when the tire rides on the curb, for the purpose of forming a flexible side portion of the tire.

In order to make the thin rubber layer high in resistance to cut failure, it is necessary to make the thickness of the thin rubber layer 0.5 to 3.0 mm, preferably 0.5 to 2.0 mm for the purpose of providing a tire which is light in weight and to make the Shore A hardness of the thin rubber layer 40° to 55°. If the Shore A hardness of the thin rubber layer is smaller than 40°, the resistance to cut failure of the thin rubber layer becomes insufficient, and, if the Shore A hardness of the thin rubber layer is larger than 55°, the flex-cracking resistant property of the thin rubber layer becomes small.

The invention will now be described in greater detail with reference to the accompanying drawings, wherein:

FIG. 4 is a cross-sectional view of one-half of a tire according to the invention showing a modified type of the upper ply therefore; and FIG. 5 is a cross-sectional view of one-half of a tire according to the invention showing another modified type of upper ply therefore.

Figure 1:
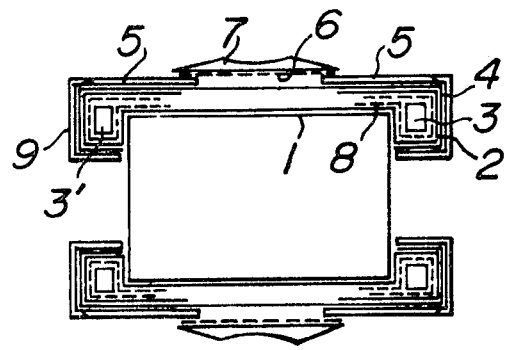
FIG. 1 is a cross-sectional view illustrating a method of producing a green case of a bias tire according to the invention.

In FIG. 1 is illustrated a method of producing a green case of a bias tire having a size of 6.45–13 2p according to the invention.

That is, about a cylindrical former 1 made of metal is superimposed a carcass ply 2 composed of a rubberized fabric containing a plurality of mutually parallel cords. A pair of bead cores 3, 3' are set on the cylindrical former 1 and each end of the carcass ply 2 is wound about the bead core 3 from the inside toward the outside thereof to form a turn-up portion. An upper ply 4 composed of a rubberized fabric containing a plurality of mutually parallel cords is superimposed about the carcass ply 2. Each end of the upper ply 4 is superimposed about the turn-up portion of the carcass ply 2 and wound about the bead core 3 from the outside toward the inside thereof.

A pair of thin rubber layers 5 each having an excellent flex-cracking and weather resistant property are previously squeezed on that region of the upper ply 4 which corresponds to the side wall portion of the tire by a separate step. The thin rubber layer 5 is made 2.0 mm in thickness and 40° to 55° in Shore A hardness after vulcanization. The thin rubber layer 5 is faced outwardly with respect to radial direction of the former.

The cords of the carcass ply 2 and upper ply 4 are angularly disposed with respect to the peripheral center line of the former 1 and oppositely inclined with each other to construct a bias carcass.

A breaker 6 and a tread rubber layer 7 having an excellent abrasion resistant property and a Shore A hardness after vulcanization of 55° to 75° are superimposed about the upper ply 4 in succession in a conventional manner. The tread rubber layer 7 is pressed upon the former 1 while rotating it by means of a stitcher roll (not shown). A green case thus obtained is removed from the former 1 and is subject to conventional shaping and vulcanization steps.

Reference numeral 8 designates a flipper and 9 shows a rubber chafer which is prebonded to the thin rubber layer 5.

Both the carcass ply 2 and the upper ply 4 are composed of polyester cords of 1,500 d/2 whose ends are 52 per 5 cm for a finished tire. The flipper 8 is composed of nylon cords of 1840 d/2 whose ends are 42 per 5 cm for the finished tire.

Figure 2:
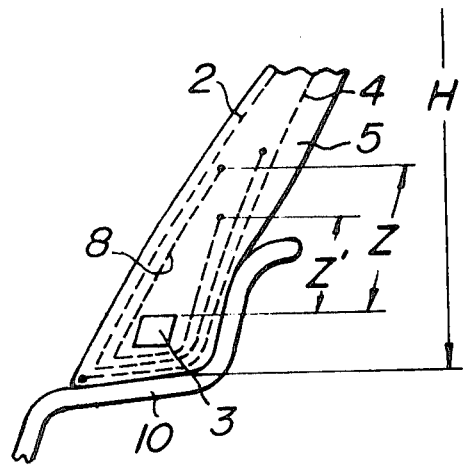
FIG. 2 is a cross-sectional view showing one embodiment of a bead portion of the bias tire according to the invention.

As shown in FIG. 2, a height Z of the upper end of an inside turn-up portion of the flipper 8 from the bead core 3 is 3.0 cm and a height Z' of the upper end of an outside turn-up portion of the flipper 8 from the bead core is 1.9 cm so as to locate these upper ends of the turn-up portions of the flipper 8 at positions having a difference in heights in a radial direction of the tire.

Figure 3:
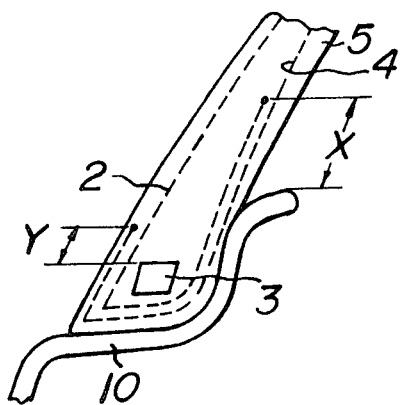
FIG. 3 is a cross-sectional view showing another embodiment of the bead portion of the bias tire according to the invention.

As shown in FIG. 3, the upper end of an outside turn-up portion of the carcass ply 2 is located at a position which is higher than the upper end of the flange of a rim 10 of the tire by X=2.5 cm. If the lower end of the upper ply 4 is terminated at the toe of the bead portion, a sufficiently high durability of the bead is obtained with a high shaping efficiency.

The heights Z, Z' of the upper ends of the turn-up portions of the flipper 8 shown in FIG. 2 may preferably be ½ to 1/5 times shorter than a height H of the inner surface of the tire in its inflated state measured from a reference line connecting the heel and heel of the bead portion of the tire united with the rim. In addition, it is preferable to make the difference between Z and Z' in the range of 0.5 to 2.5 cm.

In the embodiment shown in FIG. 3, the flipper 8 shown in FIGS. 1 and 2 is omitted and the upper ply 4 is wound about the toe of the bead portion from the outside toward the inside thereof to form a turn-up portion which is balanced with the outside turn-up portion of the main carcass ply 2.

In the embodiment shown in FIG. 3, let the height X of the upper end of the turn-up portion of the carcass ply 2 from the flange of the rim 10 be on the order of 2.5 cm, then it is preferable to make the height Y of the upper end of the inside turn-up portion of the upper ply 4 from the bead core 3 on the order of about 5.0 cm. In the present embodiment, if the upper ply 4 is terminated at the heel or toe of the bead portion, resistance to wear of the bead portion becomes insufficient probably due to unbalance in rigidity of the tire under its loaded condition.

In the bias tire according to the invention described above with reference to FIGS. 1 to 3, the side wall rubber is composed of the thin rubber layer 5 which has previously been squeezed on the upper ply 4. As a result, the use of the thin rubber layer 5 has the advantage that it is possible to make the tire light in weight and prevent generation of heat and it is not necessary to extrude the side wall rubber together with the tread rubber layer through a dual tuber which has heretofore been used in practice.

If the side wall rubber together with the tread rubber layer are extruded through a dual tuber into a composite contour having an extremely thin thickness which is extrudable, undulation is produced in the case of stitching and the extruded product becomes irregular in thickness due to such extremely thin thickness. As a result, characteristics of the tire become degraded. Finally, the use of the thin rubber layer 5 makes it possible to prevent this prior art disadvantage and effect stitching on the tread rubber layer only, thereby, significantly shortening the press working time.

In another embodiment shown in FIG. 4, an upper ply is composed of a high turn-up portion 25 of a carcass ply 23, the upper end of which is terminated at a position directly beneath a breaker or belt 24. In the present embodiment, the above mentioned thin rubber layer 26 may also previously be squeezed on the high turn-up portion 25 of the carcass ply 23 to obtain the same effect as the above mentioned effect.

In a further embodiment shown in FIG. 5, each end of a carcass ply 27 is wound about a bead core from the inside toward the outside thereof to form a turn-up portion whose upper end terminates at a position which is higher than a rim flange. In the present embodiment, use is made of a side ply 28 as an upper ply which extends from a position near the bead portion to a position directly beneath a breaker or belt 24. In the present embodiment, the thin rubber layer 26 has previously been squeezed on the side ply 28 to obtain the same effect as that described with reference to FIGS. 1 to 3. The carcass ply 23, 27 may be of bias- or radial-laid ply.

As explained hereinbefore, the use of squeezing a side wall rubber on that region of the outer surface of an upper ply which corresponds to a side wall portion of a tire provides the important advantage that the side wall portion of the tire can be made to such a thin thickness that the side wall portion could no more withstand a conventional stitching or extrusion step applied thereto. The tire becomes light in weight, and provides a material increase in resistance to generation of heat. Also the tire may be formed in an extremely simple and efficient manner.

What is claimed is:

1. A light weight pneumatic tire having a thin sidewall rubber, comprising a bias laid carcass ply composed of cords angularly disposed with respect to the circumferential direction of the tire and extending from one of a pair of bead portions through a crown portion to another bead portion, a breaker layer superimposed about the crown portion of said carcass ply, an upper ply disposed on said carcass ply and extending from the bead portion to at least an edge of the crown portion and maintaining an overlapping relation with the breaker layer, said upper ply being composed of cords crossed to the cords of the carcass ply symmetrically with respect to the circumferential direction of the tire, and a thin rubber layer disposed on the outer surface of said upper ply and having a thickness of 0.5 to 3.0 mm and a Shore A hardness after vulcanization of 40° to 55°.

2. A light weight pneumatic tire having a thin side wall rubber according to claim 1, wherein the thickness of said thin rubber layer is 0.5 to 2.0 mm.

3. A light weight pneumatic tire having a thin side wall rubber according to claim 1, wherein said upper ply is composed of an outside turn-up portion of said main carcass ply, the upper end of said outside turn-up portion being terminated at the crown portion of the tire.

4. A light weight pneumatic tire having a thin side wall rubber according to claim 1, wherein said upper ply extends from one of the bead portions through the crown portion of the carcass to another bead portion.

5. A light weight pneumatic tire having a thin side wall rubber according to claim 4, wherein said upper ply in the crown portion is interposed between the carcass ply and the breaker ply.

6. A light weight pneumatic tire having a thin side wall rubber according to claim 1, wherein both said carcass ply and said upper ply are composed of polyester cords.

7. A light weight pneumatic tire having a thin side wall rubber according to claim 1 and further comprising a flipper composed of nylon cords.

8. A light weight pneumatic tire having a thin side wall rubber according to claim 7, wherein a height Z of the upper end of an inside turn-up portion of said flipper from a bead core is higher than a height Z' of the upper end of an outside turn-up portion of said flipper from the bead core, said difference between Z and Z' being 0.5 to 2.5 cm.

9. A light weight pneumatic tire having a thin side wall rubber according to claim 8, wherein said height Z, Z' of the upper ends of the turn-up portions of said flipper 8 are ½ to 1/5 times shorter than a height H of the inner surface of the tire in its inflated state measured from a reference line connecting the heel and heel of the bead portion of the tire united with the rim.

10. A light weight pneumatic tire having a thin side wall rubber according to claim 1, wherein the upper end of an outside turn-up portion of said main carcass ply is located at a position which is higher than the upper end of a flange of a rim of the tire.

11. A light weight pneumatic tire having a thin side wall rubber according to claim 1, wherein said upper ply is wound about the toe of the bead portion from the outside toward the inside thereof to form a turn-up portion which is balanced with the outside turn-up portion of said main carcass ply.

* * * * *